United States Patent [19]

Bard

[11] Patent Number: 4,680,076
[45] Date of Patent: Jul. 14, 1987

[54] MULTIPHASE EPOXY THERMOSETS HAVING RUBBER WITHIN DISPERSE PHASE

[75] Inventor: John K. Bard, New Castle County, Del.

[73] Assignee: Hercules Incorporated, Wilmington, Del.

[21] Appl. No.: 901,097

[22] Filed: Aug. 28, 1986

[51] Int. Cl.$^4$ ............ C09J 5/10; C08K 3/04; C08F 283/10
[52] U.S. Cl. ............ 156/306.9; 156/330; 523/435; 523/468; 525/529; 525/530
[58] Field of Search ............ 523/435, 468; 525/109, 525/113, 529, 530; 156/306.9, 330

[56] References Cited

U.S. PATENT DOCUMENTS

| | | | |
|---|---|---|---|
| 3,770,698 | 11/1973 | Riew | 525/109 |
| 3,837,904 | 9/1974 | Hill | 117/139.5 A |
| 3,926,903 | 12/1975 | Scola | 260/42.28 |
| 3,926,904 | 12/1975 | Scola | 260/42.28 |
| 3,966,837 | 6/1976 | Riew et al. | 525/109 |
| 4,187,347 | 2/1980 | Brook | 428/375 |
| 4,195,113 | 3/1980 | Brook | 428/375 |
| 4,220,686 | 9/1980 | Brook | 428/375 |
| 4,222,918 | 9/1980 | Zentner et al. | 260/29.2 |
| 4,264,655 | 4/1981 | Brook | 427/381 |

FOREIGN PATENT DOCUMENTS 0130270 1/1985 European Pat. Off.

OTHER PUBLICATIONS

Paper: Addition of Polyethersulphone to Epoxy Resins by C. B. Bucknall and I. K. Partridge, The British Polymer Journal, vol. 15, Mar. 1983, pp. 71–74.
Presentation: Development of Resins for Damage Tolerant Composites–A Systematic Approach by J. Diamant and R. J. Moulton, 29th National SAMPE Symposium, 4-3-4/5/84.
Paper: Elastomer-Modified Epoxy Resins for Structural Compositions by R. Drake and A. Seibert, SAMPE Quarterly, vol. 6, No. 4, Jul. 1975.
Presentation: Reactive Butadiene/Acrylonitrile Liquid and Solid Elastomers: Formulating Epoxy Structural Adhesives, by R. S. Drake and A. R. Siebert, printed in Organic Coatings and Applied Polymer Science Proceedings, vol. 48, pp. 491–495.
Deformation and Fracture Behavior of a Rubber-Toughened Epoxy: 1. Microstructure and Fracture Studies, by A. J. Kinloch, S. J. Shaw, D. A. Tod and D. L. Hunston, Polymer 24, 1341, (1983).

Primary Examiner—Lewis T. Jacobs
Attorney, Agent, or Firm—Edmund C. Ross, Jr.

[57] ABSTRACT

Disclosed are multiphase epoxy thermosets having improved toughness and peel strength levels. The epoxy thermoset resin can serve as a matrix resin for composite structures and as a high temperature adhesive in bonding bodies together. The matrix comprises a crosslinked continuous phase and crosslinked discontinuous phase which contains the rubber phase.

15 Claims, 2 Drawing Figures

1.0µm

MULTIPHASE EPOXY THERMOSETS HAVING RUBBER WITHIN DISPERSE PHASE

This invention relates to epoxy thermosets, including composites thereof, and more particularly to a resin morphology in these thermosets that is associated with exceptional toughness and high peel strength levels relative to the Tg of the thermosets.

BACKGROUND OF THE INVENTION

Epoxy resins are well known for use in making advanced or high performance composites comprising high strength fiber made of glass, boron, carbon or the like. Structures made of these composites can weigh considerably less than their metal counterparts at equivalent strength and stiffness. Higher modulus epoxy composites, however, have been relatively brittle. This brittleness has restricted their wider application in the aerospace field because, for example, damage tolerance, an important property of flight critical components in aircraft, is related to brittleness of the component. In addition, brittleness is generally believed to be associated with lower peel strength values of high Tg epoxy thermosets used as structural adhesives.

One approach in making epoxy thermosets tougher and have higher peel strengths has been to introduce reactive rubbery polymers into the epoxy resin formulations. See Diamant and Molton, "Development of Resins For Damage Tolerant Composites—A Systematic Approach," 29th National SAMPE Symposium, Apr. 3-5, 1984. See, also, R. S. Drake and A. R. Siebert, SAMPE Quarterly, 6(4) (1975) and R. S. Drake and A. R. Siebert, Organic Coatings and Applied Polymer Science Division Proceedings, 48, 491 (1983).

Another approach for modifying epoxy thermosets has been to incorporate engineering thermoplastics into the crosslinked epoxy matrix. Various thermoplastics have been suggested and the use of a polyethersulfone as the thermoplastic modifier for epoxy resins was studied by C. B. Bucknall et al and is discussed in the British Polymer Journal, Vol. 15, March 1983 at pages 71 to 75. Bucknall et al's studies were carried out on cured epoxy-polyethersulfone blends prepared from mixtures of trifunctional and tetrafunctional aromatic epoxides, diaminodiphenylsulfone or dicyandiamide as hardener and various amounts of Victrex 100 P manufactured by ICI Ltd., said to be a relatively low molecular weight grade of polyethersulfone. The studies showed that phase separation occurred in certain of the cured epoxy-polyethersulfone blends and that some of the cured blends exhibited distinct nodular morphological features. Analyses indicated that the polyethersulfone was concentrated in the nodules and Bucknall et al surmised that the nodules were not formed by polyethersulfone alone but by a crosslinked epoxy-polyethersulfone copolymer. Bucknall et al found no clear correlation between mechanical properties such as elastic modulus, fracture toughness and creep of the cured blends and composition and concluded that the addition of polyethersulfone has little effect on the fracture toughness of the resin mixtures, irrespective of the degree of phase separation or the morphology.

SUMMARY OF THE INVENTION

Now, in accordance with this invention it has been found that epoxy thermosets which have a morphology characterized by a glassy continuous phase and a glassy discontinuous phase which also contains a rubber phase and wherein the discontinuous phase constitutes at least 25% of the total volume of the phases have superior toughness and peel strengths and that the toughness and peel strength advantages are achieved without detriment to other desirable properties associated with epoxy thermosets.

Accordingly, the present invention relates to a thermoset comprising a crosslinked epoxy resin, matrix with a fracture toughness, $K_{IC}$, of at least 1.2 MPa$\sqrt{m}$, a Tg of at least about 150° C. and comprising a glassy discontinuous phase dispersed in a glassy continuous phase that continues substantially throughout said resin matrix, the discontinuous phase constituting at least about 25 volume % of the total volume of the discontinuous and continuous phases and containing a rubbery phase. The invention also relates to composites comprising the crosslinked epoxy resin matrix and high strength filaments and to cured epoxy thermoset composites and other bodies adhered together with the multiphase thermosets hereof.

DETAILED DESCRIPTION OF PREFERRED EMBODIMENTS

The cured, i.e., crosslinked resin matrices of this invention are characterized by a morphology comprising a glassy discontinuous phase which contains a rubber phase and is preferably uniformly dispersed throughout a glassy continuous phase. The matrix has at least one Tg which is at least about 150° C. The domains of the dispersed discontinuous phase preferably are between about 0.05 and 50 microns and more preferably between 0.1 and 20 microns in largest dimension. The domains are generally spherical or ellipsoidal in shape.

The volume of the discontinuous phase constitutes at least about 25%, preferably between 35% and 65% of the total volume of the matrix resin; and the volume of the rubber phase within the respective domains of the glassy discontinuous phase is between about 0 and 98%. The total volume of the resin matrix (Vr) is defined in determining these percentages as the volume of the continuous phase (Vc) and the volume of the discontinuous phase (Vd) combined. In determining the volume of the discontinuous phase, a micrograph of a microtomed section of the resin or composite is made and the area (or an area fraction) of the micrograph occupied by the continuous phase (Ac), discontinuous phase (Ad) and filament or fiber (Af) is determined visually or instrumentally, using commercial devices such as a digitizer or image analyzer. The volume fraction or volume percent of the discontinuous phase is directly proportional to the area fraction or percent. Exceptionally tough two phase composites usually have discontinuous phases (Ad) comprising from about 45% to 55% of the total area of the micrograph less the area of the filaments (Ac+Ad−Af).

Figure 1:
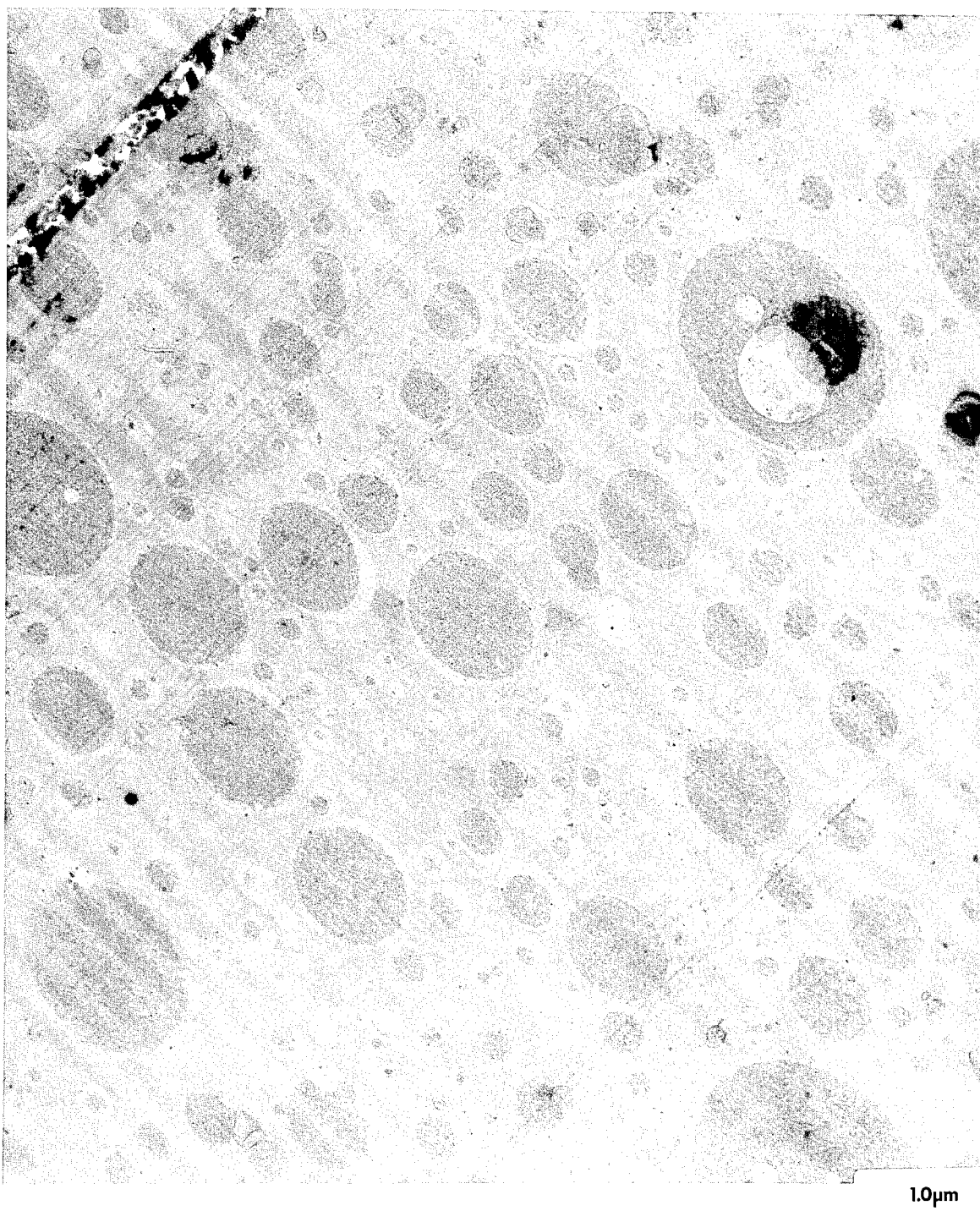
FIGS. 1 and 2 are photomicrographs of cured epoxy resins of this invention. The dark spots in the photomicrographs are a rubber phase which can be seen to be contained within the discontinuous or dispersed phase. The continuous phase in these micrographs contains a polyethersulfone oligomer and has a Tg in excess of about 150° C.
Figure 2:
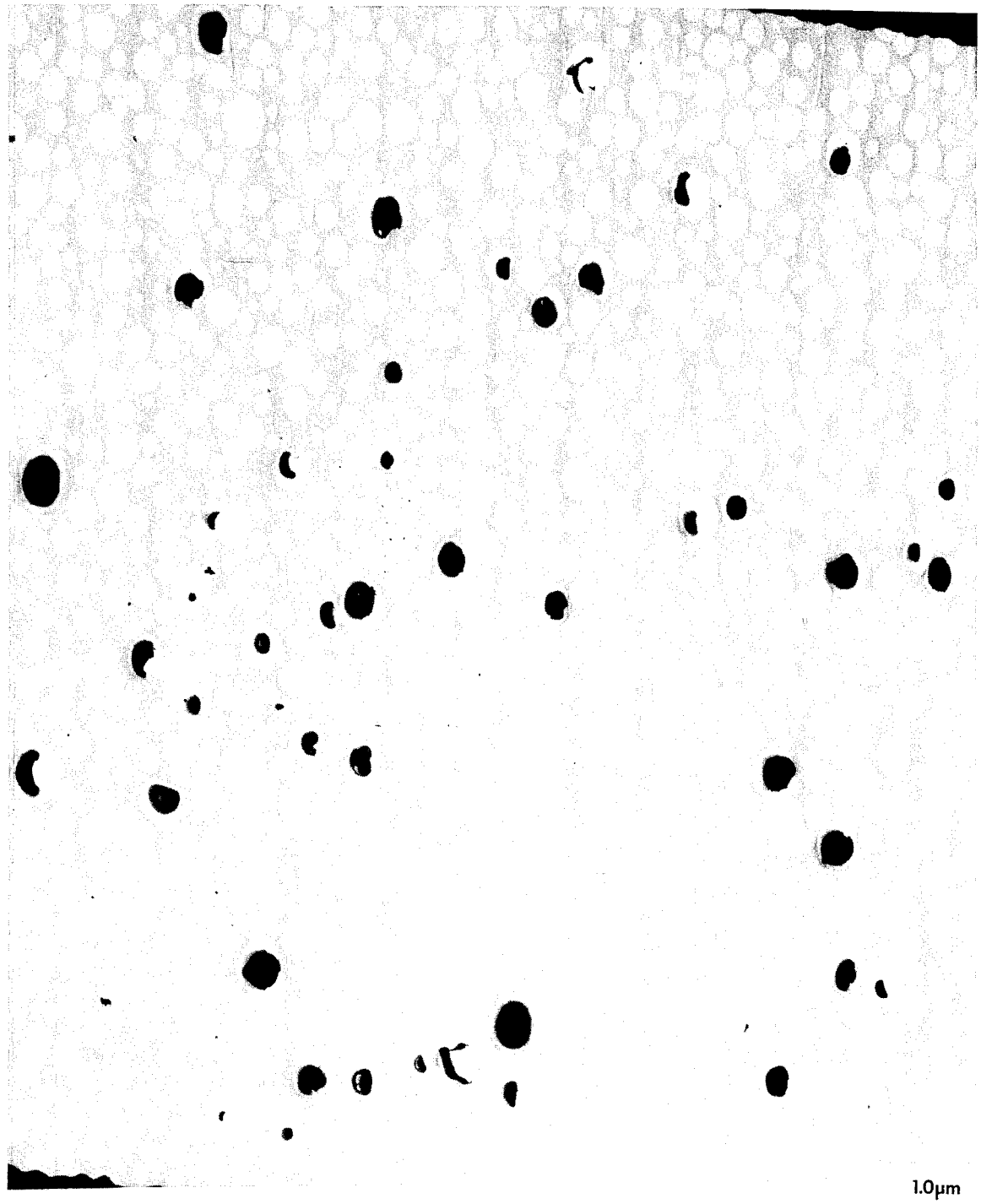

The discontinuous phase, as can be seen in FIGS. 1 and 2, has domains which contain a rubber phase in certain of the domains. However, even in the domains that are nearly all rubber phase, a small portion of such domains is free of the rubber, is glassy and yields, together with the domains that are free of any rubber phase, a Tg for the thermoset that is intermediate between the rubber phase Tg and the continuous phase Tg.

The crosslinked resin matrices of this invention are also characterized by having at least one Tg of at least about 150° C. and a fracture toughness of at least 1.2 MPa$\sqrt{\text{m}}$. The preferred crosslinked resin matrices have a fracture toughness of 1.5 MPa$\sqrt{\text{m}}$ or greater and a cohesive fracture energy, $G_{IC}$, of a least 300 joules/meter$^2$.

The epoxy thermosets and composites of this invention can be obtained from a thermosetting epoxy resin composition comprising (a) a polyepoxy component having at least about 1.5 epoxy groups per molecule; (b) an epoxy hardener; (c) an aromatic oligomer that is reactive with (a) or (b) or (a) and (b), has a molecular weight (number average) between about 2000 and 10,000, and a glass transition temperature between about 120° C. and 250° C.; and (d) a liquid rubber that is reactive with the polyepoxy component.

The polyepoxy component contains at least 1.5 epoxy groups and preferably is an aromatic polyepoxy compound having between 2 and about 4 epoxy groups per molecule. Suitable polyepoxy components for making prepregs which cure into composites and for making adhesive compositions include those which have a Tg below 50° C. Examples of polyepoxy compounds are resorcinol diglycidyl ether (or 1,3-bis-(2,3-epoxypropoxy)-benzene) marketed, for example, by Wilmington Chemical as HELOXY ® 69; diglycidyl ether of bisphenol A (or 2,2-bis[p-(2,3-epoxypropoxy)phenyl]-propane); triglycidyl p-aminophenol (or 4-2,3-epoxypropoxy)-N,N-bis-(2,3-epoxypropyl)aniline); diglycidyl ether of bromo-bisphenol A (or 2,2-bis[4-(2,3-epoxypropoxy)3-bromophenyl]-propane; diglycidylether of Bsphenol F (or 2,2-bis[p-(2,3-epoxypropoxy)-phenyl]methane); triglycidyl ether of meta-aminophenol (or 3-(2,3-epoxypropoxy)N,N-bis(2,3-epoxypropyl)-aniline); and tetraglycidyl methylene dianiline (or N,N,N',N'-tetra(2,3-epoxypropyl)4,4'diaminodiphenyl methane). Other polyepoxy compounds are triglycidyl ether of tri(hydroxyphenyl) methane, polyglycidyl ethers of phenol-formaldehyde novolacs (e.g. DEN 431 and DEN 438 marketed by Dow Chemical Company), polyglycidylethers of orthocresol-novolac (e.g. ECN 1235, ECN 1273 marketed by Ciba-Geigy), and tetraglycidyl ether of tetraphenylethane. Combinations of two or more polyepoxy compounds can be used as the polyepoxy component.

The aromatic oligomer, as stated, contains functional groups which are reactive with the polyepoxy component and/or the epoxy hardener of the composition. In a preferred embodiment the oligomer is epoxy reactive (i.e. reacts with epoxy groups) and has at least about 1.4 epoxy reactive groups per molecule. The reactive aromatic oligomer preferably contains divalent aromatic groups such as phenylene, diphenylene or naphthalene groups linked by the same or different divalent nonaromatic linking groups. Exemplary linking groups are oxy(—O—); sulfonyl(—SO$_2$—); sulfide (—S—); oxyalkylene or oxyalkyleneoxy(—OR— or —ORO— wherein R is lower alkylene preferably with 1-3 carbon atoms); lower alkylene or alkylidene (—R— or —R—(R$_1$)$_y$— wherein R and R$_1$ are independently lower alkylene and y is 1 or 2); ester groups such as —(R$_1$)$_x$COO(R$_2$)$_y$— wherein R$_1$ and R$_2$ are independently lower alkylene preferably with 1 to 3 carbons and x and y are independently zero or 1; and oxoalkylene

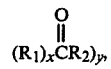

where R$_1$ and R$_2$ are independently lower alkylene where x and y are independently zero or 1. The aromatic units may be substituted with non-interferring substituents such as chlorine, lower alkyl, phenyl etc. Generally, at least twenty-five percent of the total number of carbon atoms in the reactive aromatic oligomer will be in aromatic structures, and preferably at least about 50% of the total carbon atoms are in aromatic structures.

The preferred reactive aromatic oligomers comprise polyethers and more preferably polyethers having two different types of units. A portion, preferably greater than half of these units are aromatic and more preferably are sulfone bridged diphenylene units or ketone bridged diphenylene units. The other type of unit in these preferred oligomers are aromatic or cycloaliphatic units that are not bridged (e.g., naphthalene) or are bridged by groups which are essentially nonpolar, examples of which are alkylidene such as isopropylidene bridges.

The reactive aromatic oligomers preferably have reactive groups that are terminal groups on the oligomer backbone and more preferably are reactive groups at the ends of oligomeric backbones which have little or no branching. The preferred reactive groups of the reactive aromatic oligomer are primary amine(—NH$_2$), hydroxyl(—OH), carboxyl(—COOA where A is hydrogen or an alkali metal), anhydride, thio, secondary amine and epoxy. Especially preferred are reactive aromatic oligomers having at least about 1.7 reactive groups per molecule and having at least about eighty (80) percent of the total number of reactive groups present as primary amine groups.

The preferred reactive aromatic oligomers are made, for example, by reacting a molar excess of a sulfone such as dichlorodiphenylsulfone with a dihydroxy aromatic compound or compounds such as bisphenol A or 2,7 naphthalenediol so as to yield a chloro-terminated oligomer and then reacting this chloro-terminated oligomer with an alkali metal salt of a hydroxy amine compound such as para or meta aminophenol to provide the reactive groups on the ends of the oligomer. Suitable sulfones for this procedure are meta, and para dichlorodiphenylsulfones. Among the suitable dihydroxy aromatic compounds for use in this procedure are Bisphenol A, Bisphenol F, naphthalenediols and biphenyl diols. Other procedures for producing oligomers having reactive end groups are disclosed in U.S. Pat. Nos. 3,895,094 to Brode and Kawakami and 3,563,951 to Radlman and Nischk, the latter patent using a procedure which involves forming nitro terminated oligomers and then reducing the nitro groups to amines.

An advantageous route for making the preferred reactive aromatic oligomers is shown in U.S. Ser. No. 823,912 filed Jan. 30, 1986 in the name of Jabloner and Nguyen. U.S. Ser. No. 823,912 is hereby herein incorporated by reference for such disclosure.

The glass transition temperature of the reactive aromatic oligomer preferably ranges between 140° and 220° C. A more preferred range is between 140° and 190° C. The molecular weight (number average) of the reactive aromatic oligomer preferably ranges between 2500 and 5000. Preferably, the reactive aromatic oligo-

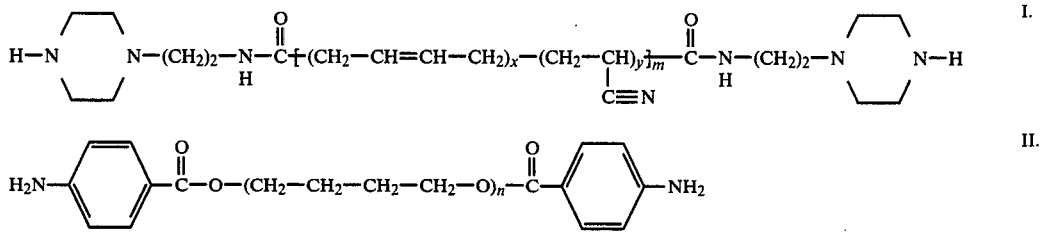

mer has a polydispersity ($M_w/M_n$) of between about 2.0 and 4.0 where $M_n$ is number average molecular weight and $M_w$ is weight average molecular weight.

The epoxy hardener of the thermosetting composition is preferably an aromatic diamine having a molecular weight below 1000. A structure that exemplifies such diamines is shown below.

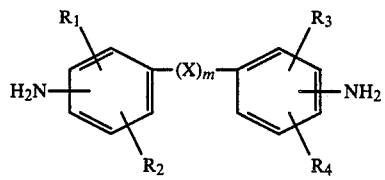

where $R_1$, $R_2$, $R_3$ and $R_4$ are independently hydrogen, halogen or an alkyl or alkoxy group with 1 to 12 carbon atoms and X is O, S, $SO_2$, alkylene, alkylidene, and oxoalkylene and m is 0 or 1, a phenylene diamine or a heterocyclic diamine. Examples are diaminodiphenylsulfone; (bis(aminophenyl)sulfone); a methylenedianiline such as 4,4′-methylene-dianiline; a diaminodiphenylether; benzidine; 4,4′thiodianiline; 4-methoxy-6-m-phenylenediamine; 2,6-diaminopyridine; 2,4-toluenediamine; and dianisidine. Alicylic amines such as menthane diamine and heterocyclic amines such as pyridine may also be employed. In some cases aliphatic amines such as secondary alkylamines which are normally fast reacting hardeners can be used alone or in combination with other epoxy hardeners provided the concentration and/or curing temperature are sufficiently low to permit control of the curing rate. Other fast reacting hardeners which can be employed for making the epoxy resins of the invention are dicyandiamide and boron trifluoride.

The reactive liquid rubber is preferably an amine functional rubber having a molecular weight between about 500 and 10,000, more preferably between about 1000 and 4000. Nitrile rubbers, especially nitrile rubbers that are amine-functional acrylonitrile/butadiene rubbers, are preferred.

Liquid rubbers having aromatic groups may also be used. An example of the latter is poly(tetramethyleneoxide-di-p-amino benzoate) marketed as Polyamine 1000 by Polaroid.

The liquid rubbers that are amine functional are preferably added neat, i.e. not as adducts in making the epoxy resin compositons. Carboxy functional liquid rubbers, when added as adducts with polyepoxy compounds, are preferably adducted with the polyepoxy compounds whose solubility and reactivity characteristics cause the rubber to phase separate within the discontinuous glassy phase rather than the continuous glassy phase of the resin.

Formulas for especially preferred liquid rubbers are:

General and preferred ranges (weight percents) of the components described above are set forth in Table I, below:

TABLE I

| | General | Preferred | More Preferred |
|---|---|---|---|
| Polyepoxide Compounds | 20%–70% | 30%–50% | 30%–45% |
| Reactive Oligomer | 10%–60% | 20%–40% | 30%–40% |
| Hardener | 5%–30% | 10%–25% | 15%–22% |
| Liquid Rubber | 2%–40% | 5%–20% | 5%–15% |

Other ingredients such as catalysts, anti-oxidants, accelerators, modifiers, fillers, and the like can be present provided their presence and amount does not destroy the advantages of the invention.

The thermosets and composites of this invention can be produced conventionally. Preferably the polyepoxy component and the reactive aromatic oligomer are first reacted together using an amount of the polyepoxy component that ensures a resulting precursor product that has unreacted epoxy groups, the liquid rubber is added and mixed in, the hardener is added and curing is completed. Alternatively, an admixture of the polyepoxy component and an equivalent amount of the reactive oligomer can be reacted together and additional polyepoxy component added to form the precursor product prior to the addition of the rubber and hardener and curing. If desired, the polyepoxy component, epoxy hardener and reactive aromatic oligomer and rubber can be admixed in bulk and cured to provide the thermosets of this invention.

Curing of the epoxy resins of this invention usually requires a temperature of at least about 40° C., up to about 200° C. or more for periods of minutes up to hours. Post treatments can be used as well, such post treatments ordinarily being at temperatures between about 100° C. and 300° C. Preferably, curing is staged to prevent exotherms, staging preferably commencing at temperatures below about 180° C.

The epoxy resins of this invention are particularly useful as adhesives. A film of adhesive material can be fabricated by melt coating or solution coating. Such films can be unsupported (containing no reinforcing fibers or fabric) or supported (containing reinforcing fibers or a fabric of reinforcing fibers). This fabric can then be placed between substrates to be bonded together and subjected to conditions of heat and pressure adequate to cause cure of the resin and bonding of the substrates. Alternatively, the resin can be used as an adhesive which is applied by a melt or solution coating technique to a surface to be bonded. A coating made from the epoxy resins of this invention can also be applied in like manner.

The epoxy resin matrices of this invention are also useful in composites containing high strength filaments in continuous form made of carbon (graphite), glass, boron and the like. Composites containing from about 30% to about 70% (preferably about 40% to 70%) of these fibers based on the total volume of the composite are preferred in making composite structures. Fibers are made of the above materials and chopped or cut to small lengths can also be employed.

A preferred manner of making the composites is by hot melt prepregging. The prepregging method is characterized by impregnating bands or fabrics of continuous fiber with the thermosetting epoxy resin composition in molten form to yield a prepreg which is layed up and cured to provide a composite of fiber and thermoset resin.

Generally, for hot melt processing it is preferred to select a polyepoxide component having a Tg below 20° C. and a reactive aromatic oligomer having amine functional groups, which, when reacted together, provide a liquid epoxy functional precursor having a viscosity of between about 10,000 and 100,000 centipoises (cps), more preferably between 30,000 and about 70,000 cps at 100° C. In hot melt prepregging the combination of polyepoxy component, reactive aromatic oligomer and hardener preferably has a viscosity below 150,000 cps at 100° C.

Other processing techniques can be used to form composites containing the epoxy resin thermosets of this invention. For example, filament winding, solvent prepregging and pultrusion are typical processing techniques in which the uncured epoxy resin can be used. Moreover, fibers in the form of bundles can be coated with the uncured epoxy resin composition layed up as by filament winding and cured to form the composites of this invention.

The epoxy resin matrices and composites of this invention are also particularly useful as film adhesives and as structures for the aerospace industry and as circuit boards and the like for the electronics industry.

The following Examples illustrate this invention but are not meant as limitations thereof. In these Examples, unless otherwise specified, all parts and percentages are parts and percentages by weight. Molecular weight ($M_n$) values, as reported in the examples, were calculated from end group analysis using the formula $$M_n = \frac{2000}{meq},$$

where meq=total milliequivalents of end groups by analyses, unless otherwise indicated.

EXAMPLE 1

This Example describes measurement of the adhesive peel strength of a control sample which contains no liquid rubber. The resin contained the ingredients listed in Table 1.

TABLE 1

| Epoxy Resin Composition - Control Sample | |
|---|---|
| Ingredient | Content (weight %) |
| diglycidyl ether of resorcinol[1] | 44.3% |
| 4,4'-bis(aminophenyl)sulfone[2] | 20.7% |
| amine functional polyarylene | 35% |

TABLE 1-continued

| Epoxy Resin Composition - Control Sample | |
|---|---|
| Ingredient | Content (weight %) |
| polyether sulfone oligomer[3] | |

[1]Heloxy ™ 69 marketed by Wilmington Chemical.
[2]DDS marketed by Aldrich Chemical.
[3]Synthesis described in detail in USSN 823,912 filed on January 30, 1986, in the name of Jabloner and Nguyen. The particular material used in this example had $NH_2$ functionality of .29 meq/gm, OH functionality of .04 meq/gm, and a degree of polymerization of n = 8–12 as measured by Size Exclusion Chromatography.

The resin composition was prepared by mixing the epoxy compound and the amine functional sulfone oligomer for 1.5 hours at 100° C. in a beaker in a heated silicone oil bath using a mechanical stirring device. The 4,4'-bis(aminophenyl)sulfone was then added and the mixture stirred for 10 minutes. The resin has then poured into a shallow pan and degassed under vacuum at a temperature of about 100° C. to form a sheet. This resin sheet was used as an adhesive film. The adhesive strength of the resin was measured by fabricating peel specimens using 0.025 inch thick sheets of aluminum alloy 2024 T3 as the adherend. The aluminum sheets were prepared for bonding using a sodium dichromate/sulfuric acid etch surface treatment, described in ASTM D2651-79, Method G and G. Carrillo, 15th National Sample Tech. Conf., 453 (1983), followed by application of a commercially available primer for structural adhesives (BR127 ®, American Cyanamid). Samples were fabricated by bonding two sheets of aluminum using the resin as an adhesive. The samples were bonded in a heated hydraulic press at a pressure of 31 pounds/square inch using a temperature cycle which consisted of a one hour heat up from 105° C. to 177° C. followed by a 4.3 hour hold at 177° C. The bonded sheets were then machined to fabricate T-peel specimens. Sample dimensions and T-peel test procedures used are shown in Fed. Spec. MMM-A-132, Aug. 24, 1981 (including amendment of Nov. 22, 1982). The peel strength of the resin tested in this manner was 3.4 pounds/inch.

EXAMPLE 2

This example describes measurement of the fracture toughness of another control sample which contains no liquid rubber. A resin composition consisting of 44.1% diglycidyl ether of resorcinol, 20.9% DDS, and 35% of the same amine functional sulfone oligomer used in Example 1 was mixed and degassed using the procedure described in Example 1. After degassing, and while the resin was still at 100° C., it was poured into a mold. The resin was then cured for two hours at 177° C. and two hours at 200° C. under vacuum to yield a solid plaque 0.3175 cm inches thick. The fracture toughness of the material was measured on specimens cut from the plaque. Details of sample dimensions, test procedures, and data analysis are given in U.S. Ser. No. 702,518 filed Feb. 19, 1985 in the name of Chu, Jabloner and Swetlin. The fracture toughness of the resin, as characterized by the critical stress intensity factor ($K_{IC}$), was 1.67 MPa$\sqrt{m}$.

EXAMPLE 3

This example describes measurement of the fracture toughness and T-peel strength of a resin containing an amine functional liquid rubber. The specific composition is given in Table 2.

TABLE 2

| Epoxy Resin Composition | |
| --- | --- |
| Ingredient | Content (weight %) |
| diglycidyl ether of resorcinol[1] | 38% |
| 4,4'-bis(aminophenyl)sulfone[1] | 17% |
| amine functional polyarylene polyether sulfone oligomer[1] | 35% |
| amine terminated butadiene/ acrylonitrile rubber[2] | 10% |

[1]Same material as described in Example 1.
[2]ATBN 1300 × 16, B. F. Goodrich - amine active hydrogen equivalent weight = 900, acrylonitrile content = 16%.

The resin composition was prepared by mixing the diglycidyl ether of resorcinol and the amine functional sulfone oligomer for one hour at 100° C. using the same procedure used in Example 1. The amine functional liquid rubber was then added, and the mixture was stirred for 30 minutes at 100° C. The 4,4'-bis(aminophenyl)sulfone was then added and the mixture stirred for a final five minutes at 100° C. The resin was then degassed as described in Example 1. Peel strength measurements were conducted as described in Example 1. A 0.3175 cm thick plaque was also prepared by the method described in Example 2, and fracture toughness measurements were conducted as described in Example 2. The T-peel strength was 18.7 pounds/inch. The fracture toughness, as characterized by $K_{IC}$, was 2.28 MPa$\sqrt{m}$.

EXAMPLE 4

The phase structure of a cured resin was investigated using transmission electron microscopy (TEM). The procedure used for TEM sample preparation and analysis is described in U.S. Ser. No. 702,518 of Chu, Jabloner and Swetlin filed Feb. 19, 1985. The composition of the sample examined is listed in Table 3.

TABLE 3

| Composition of Sample Examined by TEM (Weight %) | |
| --- | --- |
| Ingredient | Epoxy Resin Composition |
| diglycidylether of resorcinol[1] | 38% |
| 4,4'-bis(aminophenyl)sulfone[1] | 17% |
| Amine functional sulfone oligomer[1] | 35% |
| Amine terminated butadiene/acrylonitrile rubber[2] | 10% |

[1]The amine functional sulfone oligomer is the same material as was used in Examples 1 through 3 and the diglycidyl ether and 4,4'-bis(aminophenyl)sulfone are described also in Examples 1 through 3.
[2]ATBN 1300 × 16 (B. F. Goodrich) - same material used in Example 3.

A 0.3175 cm thick plaque of the cured epoxy resin composition was made as described in Example 3. The TEM sample prepared from these plaques used the procedure described in U.S. Ser. No. 702,518 filed Feb. 19, 1985.

"The glass transition temperature is obtained using a Rheometrics Dynamic Spectrometer (RDS). All measurements are made in the temperature sweep mode at a frequency of 10 rad/sec. The strain applied to the torsional rectangular test samples (2.5"×0.5"×0.0125") is kept within 0.2% to insure that the measurements were in the linear viscoelastic range. The tan max temperature is defined as the glass transition temperature (Tg) of the sample."

FIG. 1 is an electron micrograph of the cured epoxy resin. The TEM sample was prepared as described in U.S. Ser. No. 702,518 filed Feb. 19, 1985, with the addition that the thin sections were exposed to $O_sO_4$ vapor for one hour prior to exposure to $R_uO_4$ vapor. $O_sO_4$ reacts preferentially with the unsaturation in the rubber molecule, so that the rubber phase appears dark in TEM micrographs. FIG. 1 shows that the rubber phase lies within the dispersed phase. The cured epoxy resin has a three phase structure which consists of domains dispersed in a matrix phase, in which the dispersed domains consist of a rubbery phase in the center of a glassy phase.

EXAMPLE 5

In this example, measurement of the fracture toughness of a resin toughened with a different amine functional rubber than that used in Example 3 is described. The compositions of the resins tested are provided in Table 4.

TABLE 4

| | Epoxy Resin Compositions | | |
| --- | --- | --- | --- |
| Ingredient | Sample A | Sample B | Sample C |
| diglycidyl ether of resorcinol[1] | 44.3% | 41.7% | 39% |
| 4,4'-bis(aminophenyl) sulfone[2] | 20.7% | 18.3% | 16% |
| Amine functional sulfone oligomer[3] | 35% | 35% | 35% |
| Polytetramethyleneoxide-di-p-amino benzoate[4] | 0% | 5% | 10% |

[1]Described in Example 1.
[2]Described in Example 1.
[3]See Example 1. Terminal functionality of .35 meq/gm NH$_2$, 0.03 meq/gm OH and less than .03 meq/gm Cl.
[4]Polamine 1000 TM marketed by Polaroid Corporation, number average molecular weight = 1238, amine equivalent weight = 619 (manufacturer's literature).

Resin samples were prepared by the same procedure used in Example 2. The amine terminated sulfone oligomer was mixed with the diglycidyl ether of resorcinol for 1.5 hours at 100° C., at which time the Polamine 1000 ® was added and mixed for 30 minutes. The 4,4'-(aminophenyl)sulfone was then added and mixed for 10 minutes. Plaques of thickness 0.3175 cm thick were fabricated and fracture toughness measurements made using samples taken from these plaques using the same procedures described in Example 2. The results are as listed in Table 5.

TABLE 5

| $K_{IC}$ of Polamine TM 1000 Modified Resin | |
| --- | --- |
| Sample | $K_{IC}$ |
| A | 1.47 |
| B | 1.91 |
| C | 1.98 |

EXAMPLE 6

In this example, examination of the phase structure of the rubber modified resin described in Example 5 using TEM is described. Plaques of thickness 0.3175 cm were prepared having the same compositions as Sample C of Example 5 using the same procedure as in Example 5. Electron micrographs of the phase structure were obtained using the procedure described in Example 4 with the exception that only exposure to $RuO_4$ vapor was done for staining purposes. FIG. 2 contains an electron micrograph of the resin. As can be seen in the figure, the rubber phase (dark phase) exists as a third phase within the glassy dispersed phase of the structure.

What I claim and desire to protect by Letters Patent is:

1. A thermoset comprising a crosslinked epoxy resin matrix with a fracture toughness, $K_{IC}$, of at least 1.2 MPa$\sqrt{\text{m}}$, at least one Tg of at least about 150° C. and comprising a glassy discontinuous phase which contains a rubber phase and is dispersed in a glassy continuous phase that continues throughout said resin matrix, said discontinuous phase constituting at least about 25 volume % of the total volume of said phases.

2. A thermoset in accordance with claim 1, wherein said matrix contains high strength filaments.

3. A thermoset in accordance with claim 1, wherein said matrix contains carbon (graphite) fiber as at least a portion of said filaments.

4. A thermoset in accordance with claim 1, wherein said discontinuous phase constitutes between about 45% and about 55% of the total volume of the discontinuous and continuous phases and said rubber phase comprises about 10-90% of said discontinuous phase.

5. A thermoset in accordance with claim 1, wherein said discontinuous phase comprises domains having a largest dimension of between about 0.1 and 50 microns.

6. A thermosetting epoxy resin composition comprising: (a) about 20-70% by weight of a polyepoxy component having on average of at least about 1.5 epoxy groups per molecule (b) an amount of an amine hardener having molecular weight below 1000 sufficient to provide from 0.8 to 1.5 equivalents of active hydrogen atoms per one equivalent of epoxy groups in the composition, (c) from 10 to 60% by weight of the composition of an aromatic oligomer having a number average molecular weight between about 2,000 and about 10,000, a glass transition temperature between about 125° C. and 250° C. and at least 1.4 functional groups per molecule which are reactive with (a) or (b), or (a) and (b) under curing conditions for the composition and (d) a liquid rubber that is reactive with epoxy.

7. The composition of claim 6, wherein the amine hardener comprises an aromatic amine.

8. The composition of claim 7, wherein the oligomer contains sulfone bridged diphenylene units.

9. The composition of claim 8, wherein said liquid rubber is amine functional.

10. The composition of claim 9, wherein said liquid rubber has a molecular weight between about 1000 and 3000.

11. The composition of claim 10, wherein said rubber is a nitrile rubber.

12. The composition of claim 6, which contains high strength filaments.

13. The composition of claim 12, wherein said high strength filaments are carbon fiber.

14. A method of adhesively bonding first and second bodies which comprises applying an amount of the composition of claim 6 between said first and second bodies and curing said composition.

15. The method of claim 14, wherein said epoxy resin composition is applied as a partially cured film between said bodies.

* * * * *